Aug. 13, 1935.  C. B. HILLHOUSE  2,011,339
METHOD OF SCREENING COMBUSTION FROM MATERIALS HEATED THEREBY
Filed Nov. 10, 1932  2 Sheets-Sheet 1
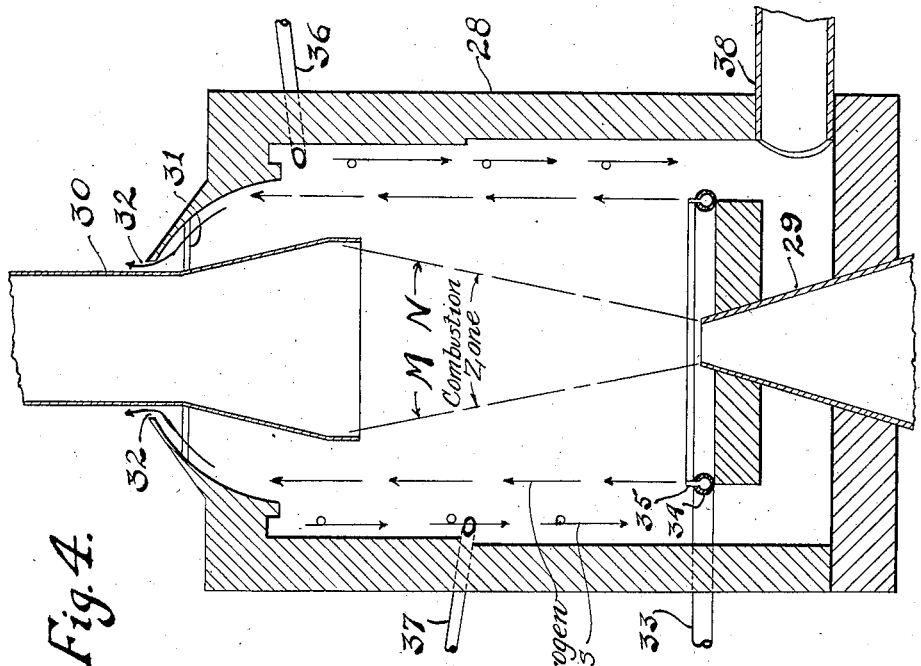
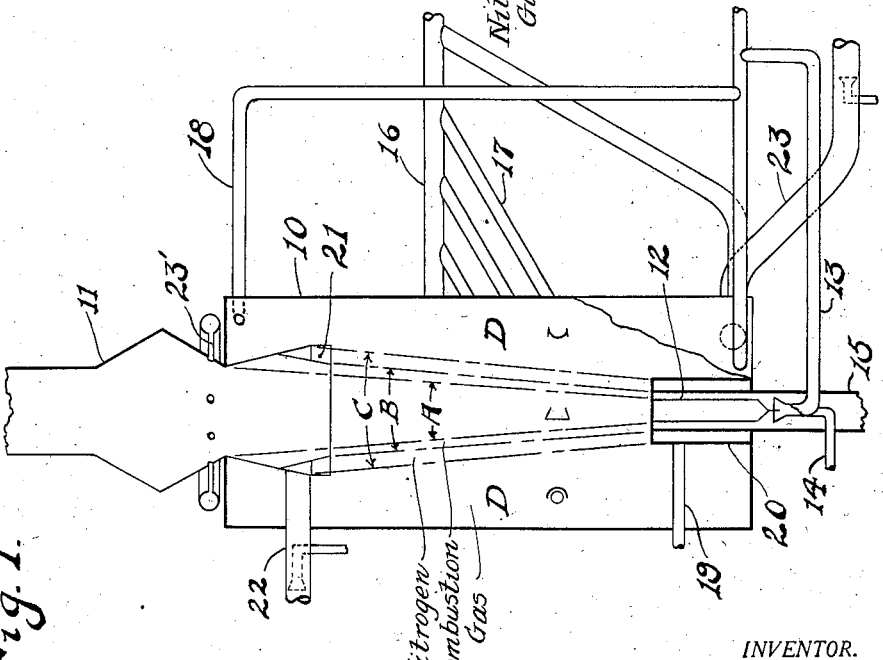
INVENTOR.
Charles B. Hillhouse,
BY Raymond Jones
ATTORNEY.

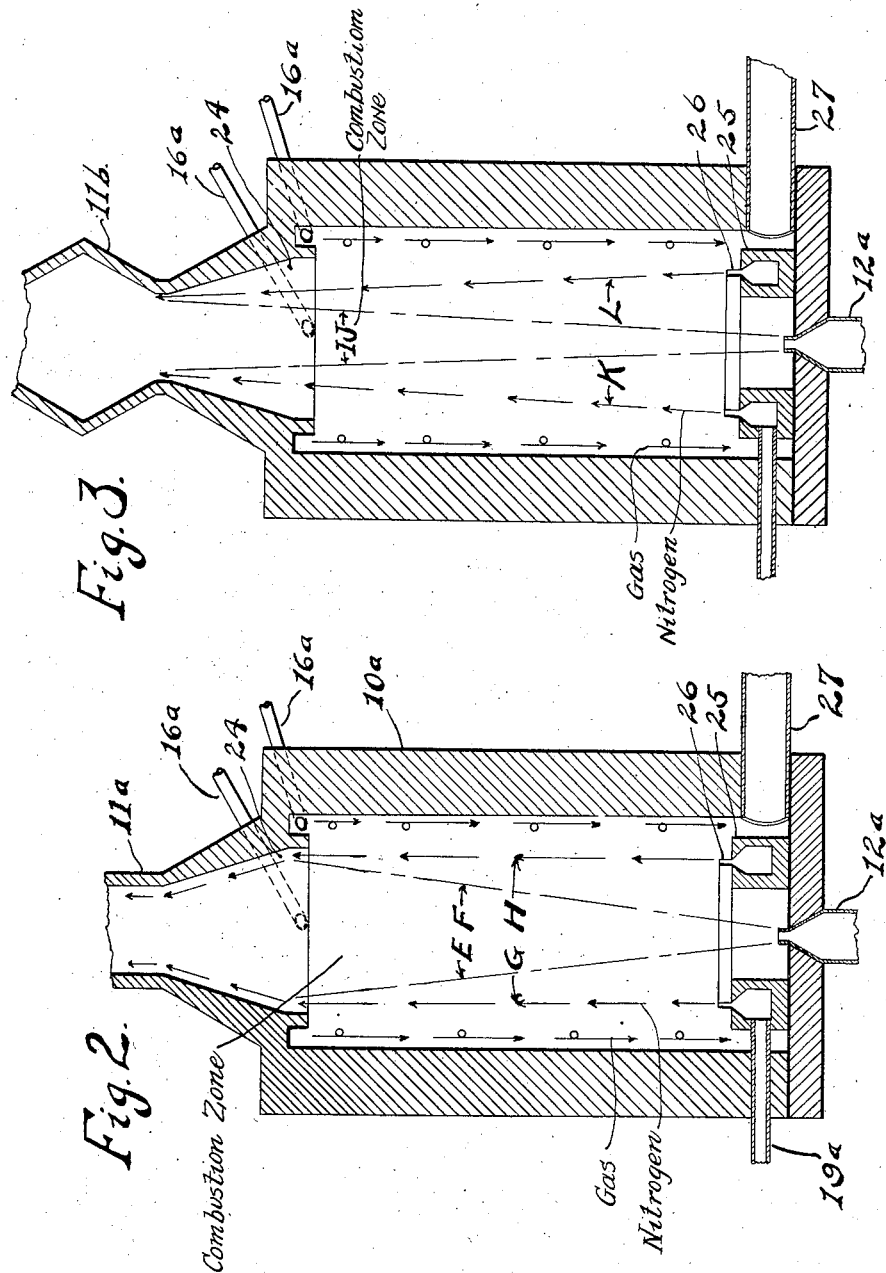

Patented Aug. 13, 1935

2,011,339

UNITED STATES PATENT OFFICE 2,011,339

METHOD OF SCREENING COMBUSTION FROM MATERIALS HEATED THEREBY

Charles B. Hillhouse, New York, N. Y., assignor to Sylvia Remsen Hillhouse, New York, N. Y.

Application November 10, 1932, Serial No. 642,098

3 Claims. (Cl. 263—1)

This application relates to a method of screening combustion from materials heated thereby, and more particularly to a method of transferring heat from a combustion zone positioned axially in a generator to materials moving relatively thereto either helically or otherwise, and wherein the gases of combustion are surrounded by a moving fluid screen between the combustion and materials which defines and confines the path of the combustion gases through the chamber, and has for its main object to prevent gases of combustion from mixing into the materials acted upon by said heat without reducing the amount of radiant heat that can be radiated to said objects from the axial flame or combustion zone.

This application is a continuation in part of application Serial No. 433,049, filed March 4, 1930, for Method of dissociating natural gas, now Patent No. 1,892,559 which, in turn, was a continuation in part of my application Serial No. 346,364, filed March 12, 1929, for Method of utilizing free oxygen, and bearing Patent No. 1,842,609, dated January 26, 1932.

Nitrogen is preferred to other fluid substances as the moving screen to surround axial combustion because it is incombustible and because it is without or possesses low chemical affinity for other elements at usual combustion temperatures so will not itself be attracted out of its proper course and will prevent any chemical combination between any substances which it separates and protects. Under certain conditions, some other substance might be used as, for instance, a stream of steam.

Nitrogen used in this method might be obtained as the product of combustion of free hydrogen with air. In cases where hydrogen dissociated from natural gas is burned as fuel, the usual discarded gas of combustion would cost nothing.

Nitrogen may also be obtained from commercial methods of air compression and the semipure oxygen may be utilized for raising the temperature of axial combustion. Nitrogen is twice as heavy as several other fluid substances so the annular screen may be injected through the chamber with half as much pressure required for these other substances. If, on account of greater velocity, the nitrogen screen draws into its current and carries away a portion of the adjoining natural gas or made gases, no great loss will occur as it can be used as fuel. If natural gas should be dissociated to obtain hydrogen for the manufacture of nitrates, a mixture of nitrogen from the screen into the free hydrogen would make no adverse difference.

The method to be followed is shown in the accompanying drawings, wherein—

Figure 1 is a view partly in section in conventional form of a device wherein the method may be practiced in dissociating natural gas;

Fig. 2 is a view in cross section of a modification wherein the method may be applied to the heating of other materials; and Figs. 3 and 4 are views in cross section of further modifications.

Referring to the drawings in detail, Fig. 1 shows a device wherein pressure and suction are employed to carry a circular sheet of nitrogen from the burner to the roof of a chamber, whereas in Figs. 2 and 3 only pressure is employed to maintain such sheet in motion.

In Fig. 1, the combustion chamber is provided with an outer wall 10 and a flue or vent 11 which is preferably flared closely adjacent the chamber. A central burner 12 circular in form is used to project a circular flame or zone of combustion as shown within the confines of the dot-and-dash lines A and B. Fuel for combustion is supplied by conduits 13 and 14 and air for combustion from conduit 15. Materials to be acted upon, as for instance, natural gas to be dissociated or materials for producing water gas or the like, are supplied to the reaction zone D—D under pressure through conduits 17 connected to a main 16 and at a point higher up through a conduit 18. The jets from conduits 17 and 18 are directed tangentially into the chamber and the materials supplied therefrom pass helically downward through the zone D—D between the axial flame and the walls 10 in a manner to receive heat from the combustion zone A—B.

In order to insure that no mixing of the gases of combustion into the materials being heated will take place, I provide a pipe 19 through which pure nitrogen may be forced under considerable pressure into a narrow annular sheath 20 which surrounds the burner 12, whereby a thin nitrogen shield or screen is forced upwardly to closely surround the axial flame A—B as shown between the dot-and-dash lines B and C. Steam may be admitted into sheath 20 and used as a screen in making water gas instead of nitrogen as shown in Fig. 1 in dissociating natural gas. At the inner end of the flue 11, I provide an annular passage 21 arranged with one or more suction pipes 22, the suction above and the pressure below insuring the passage of the gaseous screen through the chamber. The dissociated natural gas or made water gas is withdrawn from the chamber through a conduit 23. Controllable amounts of air are admitted through inlets 23' in order to break up and remove boundary layers of gases produced by turbulence in the vicinity of the flared outlet 11, thereby preventing a back up of exit gases.

In Fig. 2, a modified method of leading off the nitrogen is shown. The chamber is formed from walls 10a and terminates in a flue 11a. A central burner is shown at 12a. Nitrogen is supplied from a conduit 19a to an annular ring 25, the upper face of which is provided with a circular form of outlet 26 from which nitrogen issues and flows upwardly in a thin annular sheet G—H to surround the combustion zone or flame E—F. After the nitrogen has reached the roof of the chamber by its own momentum, it strikes the sloping roof at 24 and is deflected into the flue 11a. The materials to be acted upon and heated by the axial flame are supplied to the chamber from conduits 16a tangentially to the chamber wall and pass downwardly helically around the axial flame and are drawn off from the chamber by a conduit 27.

In Fig. 3, the device is shown as modified to direct the annular nitrogen outlet inwardly to project a nitrogen screen K—L upwardly to surround the axial flame I—J, and this nitrogen screen passes directly into the flue 11b also by its own momentum and does not strike the sloping roof at 24.

In Fig. 1, nitrogen passes out of the furnace separately from the gases of combustion. In Figs. 2 and 3, nitrogen of the screen and gases of combustion pass out together through the flue. A flared outlet 11 as shown in Fig. 1 is used to produce a smooth exit of gases of combustion and other substances.

Figs. 1, 2 and 3 have shown the direction of the nitrogen screen to be upward in a vertical circular chamber, but the direction of the screen or shield may be downward or in any direction as well, as also the shape of the chamber may be oblong or other shape or placed horizontally or at any suitable angle and the nitrogen screen may be made with a multiple of jets in annular form and the flame may be stream line or other shape.

In Fig. 4, a modification is shown wherein a screen of steam is employed to surround the axial flame. The chamber 28 is provided with a central fuel burner 29 at one end and an outlet flue 30 at the opposite end, and which is supported by struts 31 in a manner to leave an annular gap or slot 32 between the roof and the flue. A steam conduit 33 supplies steam to an annular pipe 34 which has a vertically extending annular outlet 35. Carbonaceous materials to be heated are fed in tangentially from a pipe 36 and superheated steam is supplied to the chamber by one or more tangentially arranged inlet pipes 37. The made gases or products produced are drawn off through an outlet 38.

The steam supplied from outlet 35 is projected upwardly in a cylindrical sheet to impact the chamber roof and escapes through slot 32. The materials to be heated supplied through pipes 36 and 37 are whirled helically around the axial flame zone M—N and pass downwardly. The screen of steam flows between these materials and the flame zone to function in a manner similar to that of the nitrogen screen in Figs. 2 and 3. The made gas is drawn off through outlet 38.

With an incombustible and chemically insulating moving screen of nitrogen separating the gases of combustion from the materials to be heated dependence on the relative velocities of axial combustion and of the helically moving materials assumes much less importance than when no screen is interposed, so flame luminosity may be increased and the gases of combustion may have reduced velocity. What has been said of nitrogen above, applies as well to steam when used.

The operation of the devices shown to carry out the method will be obvious from the foregoing description. The principle of the method disclosed, while simple, is broad and may be applied in various structures in relations wherein an axial combustion zone is employed to radiate heat to a surrounding zone of moving materials that are being acted on, and wherein there would be any tendency through chemical affinity for the combustion gases to react upon the materials being heated.

Various modifications are shown in the drawings and described in the specification, but it is to be understood that other modifications are contemplated such as will be included within the scope of the appended claims.

What I claim is:

1. The method of screening a combustion zone positioned axially in a chamber from materials heated thereby which comprises maintaining an axial zone of combustion within the chamber, passing material to be heated along a path in heat exchange relation with said axial zone, passing a gaseous shield between said zone of combustion and the materials heated thereby and producing a suction within the chamber to facilitate and control the flow of said gaseous shield.

2. In the method as set forth in claim 1, wherein the gaseous shield comprises an incombustible gas.

3. The method of screening a combustion zone positioned axially in a chamber from materials heated thereby which comprises maintaining an axial flame within the chamber, passing material to be heated along a helical path around said flame, and maintaining a shield of incombustible gas between said flame and materials for preventing chemical reaction or mixing therebetween.

CHARLES B. HILLHOUSE.